Jan. 7, 1958     T. W. ROBERTS     2,818,637
METHOD OF SEALING TOGETHER THE GLASS MEMBERS OF ELECTRON TUBES
Filed April 13, 1954     3 Sheets-Sheet 1

INVENTOR.
THERON W. ROBERTS
BY
ATTORNEYS

Jan. 7, 1958 T. W. ROBERTS 2,818,637
METHOD OF SEALING TOGETHER THE GLASS MEMBERS OF ELECTRON TUBES
Filed April 13, 1954 3 Sheets-Sheet 2
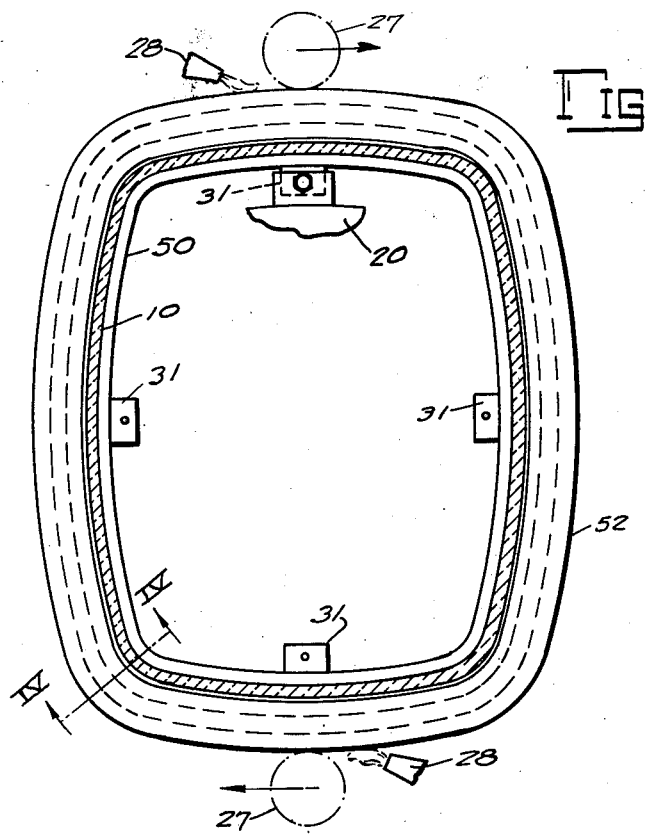
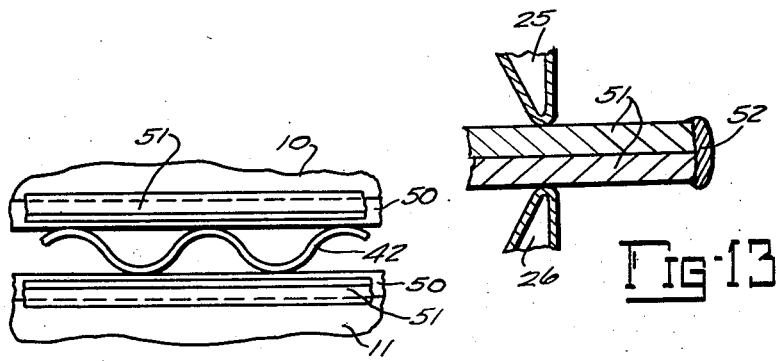
INVENTOR.
THERON W. ROBERTS
BY
ATTORNEYS Jan. 7, 1958     T. W. ROBERTS     2,818,637
METHOD OF SEALING TOGETHER THE GLASS MEMBERS OF ELECTRON TUBES
Filed April 13, 1954     3 Sheets-Sheet 3
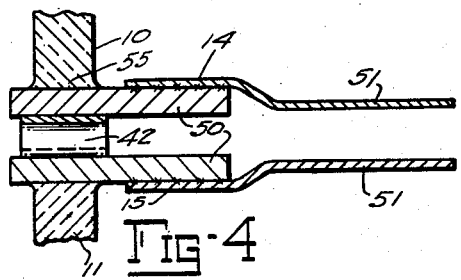
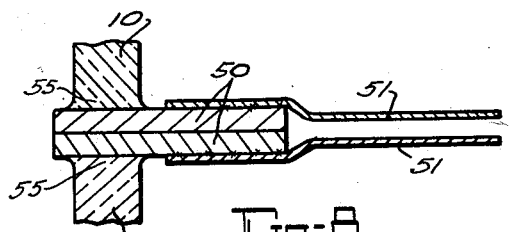
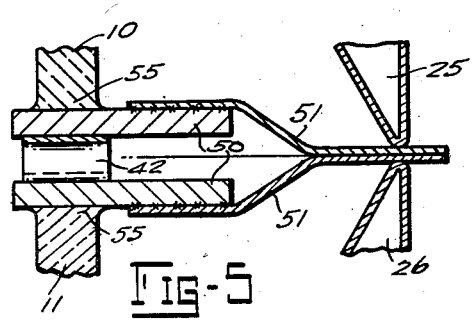
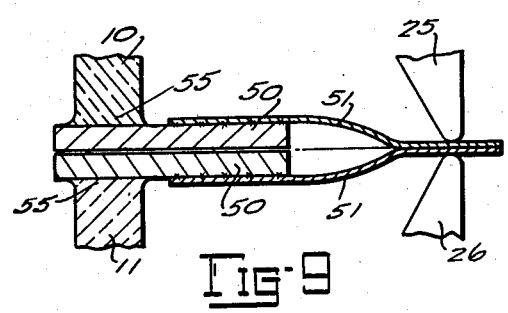
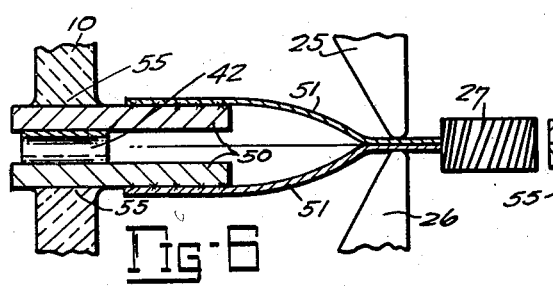
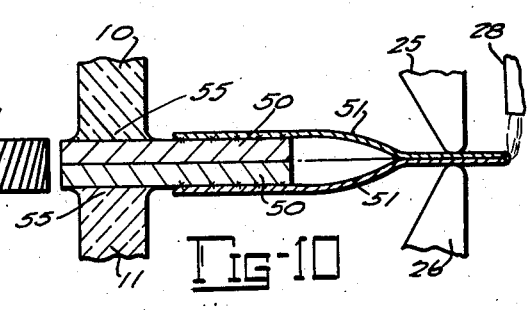
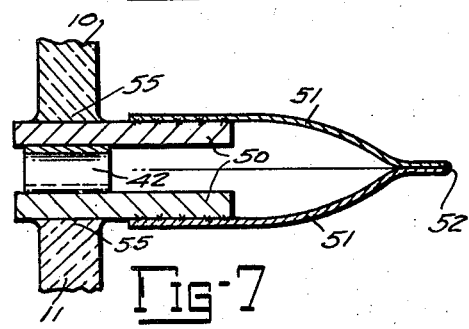
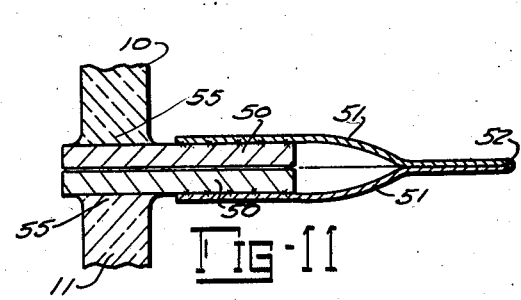
INVENTOR.
THERON W. ROBERTS
BY
ATTORNEYS

2,818,637
METHOD OF SEALING TOGETHER THE GLASS MEMBERS OF ELECTRON TUBES

Theron W. Roberts, Toledo, Ohio

Application April 13, 1954, Serial No. 422,724

6 Claims. (Cl. 29—471.9)

The present invention relates to a method of producing television or electron tubes of the "all-glass" type suitable for the reproduction of pictures in color. The invention may also be used in the production of other tubes of the "all-glass" type, and in particular where such tubes are finally assembled under vacuumized conditions.

In the case of television reception, the reception in color may be obtained through the use of a tube containing a suitable viewing-screen assembly comprised of a tri-color phosphor plate and an apertured mask or other grid-like element suitably mounted or positioned in the viewing end of the tube.

Such masks or grid-like elements are normally installed in the tube before the tube members are finally joined or sealed together, and because such elements are sensitive to heat the tube members must be joined or sealed together in a manner not conducive to damage to said elements.

After the tubes have been completely assembled they are subjected to a preliminary operating test and under such test some of them will undoubtedly be found imperfect to the point of requiring some adjustment of the color pack or internal adjustment of some other form.

Through the use of the thin, wide band portions of the sealing rings, as disclosed herein, it will then be possible to remove the line or perimeter sealed edge of said bands, thus separating the glass members and permitting access to the inner mechanisms of the tube for any needed adjustment.

After such adjustment the glass members may again be sealed together in operative relation. Such sealing, unsealing and resealing may be accomplished several times in succession, when needed, mainly because of the originally provided excess width in the thin portions of the sealing bands as well as the perimeter sealing of the band edges.

The essence of this invention resides in the method by which such an "all-glass" electron tube, with its component color sandwich or grid element incorporated therein, may be assembled by joining the glass face member and the class funnel member to one another, through the use of endless metal strips arranged as integral parts of each glass member and wherein the outer or peripheral dimension of such metal strips or bands is greater than that of the glass members. These endless metal strips or bands are welded to the sealing end of each glass member and subsequently to each other for joining the glass members together.

In the assembling of these component glass members, an endless corrugated or spring-like member, having the same contour as that of the sealing edges of the glass members, may be interposed between the sealing bands to provide a distribution of the load stress condition therebetween. The load on these members in a 21" tube is approximately four thousand pounds when the tube is vacuum sealed. This compression ring feature provides the means whereby any load stress in the glass members will be uniformly distributed when the final assembly of the tube is completed.

The sealing bands or strips are formed in such manner that their two respective welding portions have cross-sectional areas compatible with the type of welding or sealing to which they will be subjected in their end use. For example, that portion of the band which is welded to the glass is of heavier cross-sectional area than that of the portion which is to be welded to another metal band in order to obviate detrimental flexure of the heavier metal band at the point of glass-to-metal interface of the seal. The thin cross-sectional area of the outer portions of the band provides several different desirable features, (*a*) to obviate or reduce heat transfer to the glass, (*b*) to permit high speed welding of one band to another of similar cross section and (*c*) to permit successive resealing of these bands subsequent to the original closing or sealing of the tube.

Such thin band construction substantially reduces any detrimental heat transfer condition, so far as the glass portions of the tube assembly may be concerned, and in addition this thin metal portion is highly susceptible to heat control when brought into contact with externally applied heat control barriers such as water-cooled clamping members interposed between the outer peripheral sealing edges thereof and the heavy inner edge portions to which each glass member is welded.

The clamping members for the bands extend completely and continuously around the tube and have opposed line contact with opposite sides of the bands throughout the peripheral contour of the tube.

Additionally, these thin portions of the sealing bands eliminate the need of any high degree of accuracy during their original fabrication due to the fact that during the sealing operation they are clamped together under applied pressure of a degree sufficient to overcome any surface irregularities which might exist in their meeting surface areas. Also these thin portions reduce the transmission of stress to the heavy portions of the bands when they are subjected to the clamping pressure.

In the assembly of a complete tube in accordance with this present invention, there are series of steps to be followed, the order or sequence of which may be varied or changed under certain conditions or circumstances but in most instances the sequence may be approximately as follows:

*a*. Endless metal bands are permanently and hermetically welded to the sealing edges of each glass member, namely, the face plate and funnel members.

*b*. The color sandwich is mounted on the band attached to the funnel member and the electron beam guns are mounted in the neck of the funnel member.

*c*. These glass members are then arranged with the bands in juxtaposed relation with a separate resilient band member interposed therebetween when necessary, but there may be cases where the resilient member is eliminated.

*d*. Cooled clamping members which completely surround the periphery of the glass members, move toward each other clamping the thin portions of the bands therebetween under a pressure sufficient to iron out any surface irregularities in the bands and insures a contact therebetween which is close or intimate enough to permit vacuumizing, heliarc welding or other forms of sealing. Preferably the tube is then vacuumized or preloaded in some manner such as the creation of an external pressure on each glass member.

*e*. Cutting, forming or trimming devices and complementary heating or welding heads move around the periphery of the tube and a trimming or shaping of the thin edges of the two bands will be accomplished along a contour line parallel to the peripheral contour of the sealing edges of the glass members, and concomitantly therewith the welding together of these edges will occur, thereby forming a hermetically sealed edge. The clamping, preloading and welding operations occur while the various members are so positioned that no stress will be promulgated in the glass members. However, upon releasing the bands from the clamping pressure and the removal of the preloading pressure on the glass members, a stress may be built up in the edge or interface portions of the glass adjacent the heavy portions of the bands.

*f.* The assembled tube is then presented to a final vacuumizing which brings the glass members and sealing bands back into the position which obtained during the band joining or sealing operation, and the glass tube may then be hermetically sealed under high vacuum at a point removed from the band area. Thus the glass parts in their final sealed relationship are again in a position where any detrimental stress in their interface portions is obviated, and under normal use they are stress free in the areas along the glass-to-metal interface seal.

In the drawings:

Fig. 3 is a sectional plan view of the sealing bands taken at line III—III on Figs. 1 and 2 showing the trimming cutters, welding nozzles and the sandwich mounting pads. In both of the illustrated structures this view will remain the same;

Fig. 4 is a cross-sectional view through the sealing bands taken at IV—IV on Fig. 3 showing the structure at III—III of Fig. 1, and showing the resilient or pressure load band between the sealing bands;

Fig. 5 shows the position or arrangement of the sealing bands as in Fig. 4 but with the sealing bands under clamping pressure and the tube still open to the atmosphere;

Fig. 6 shows the parts juxtaposed as in Fig. 5 but with the sealing bands drawn closer together due to vacuumizing of the tube and with the trimming cutter in trimming contact with the edges of the bands;

Fig. 7 shows the parts in the expanded position found when the tube is not vacuumized but with the trimmed edges of the bands shown welded or sealed tight;

Fig. 8 is a cross-sectional view taken at VIII—VIII on Fig. 3 showing the band structure as in Fig. 2 at III—III;

Fig. 9 shows the position of the bands under clamping pressure but with the tube open to the atmosphere;

Fig. 10 shows the position of the bands when the tube is vacuumized, with the bands clamped and the edges of the bands being fused together;

Fig. 11 shows the arrangement of the bands subsequent to the band edge fusing and with the interior of the tube returned to atmospheric pressure;

Fig. 12 is a side view of a portion of the tube structure with the parts in the position shown in Fig. 4 showing the resilient band between the two glass members; and Fig. 13 is an enlarged cross-sectional view through a portion of the sealed edges of the thin bands.

Figure 1:
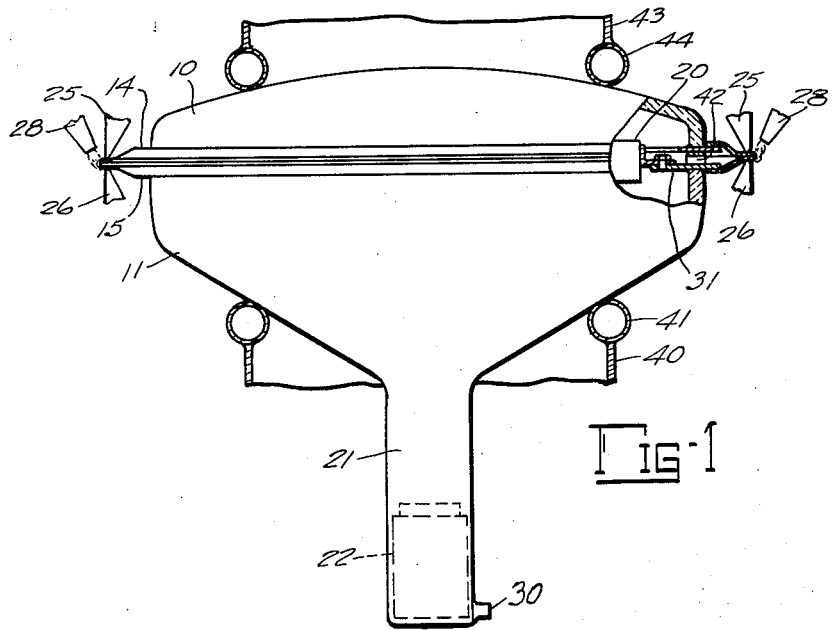
Fig. 1 is a part sectional elevational view illustrating the mounting of the color sandwich and the electron beam gun assembly upon the glass funnel member and the welding of the sealing bands.
Figure 2:
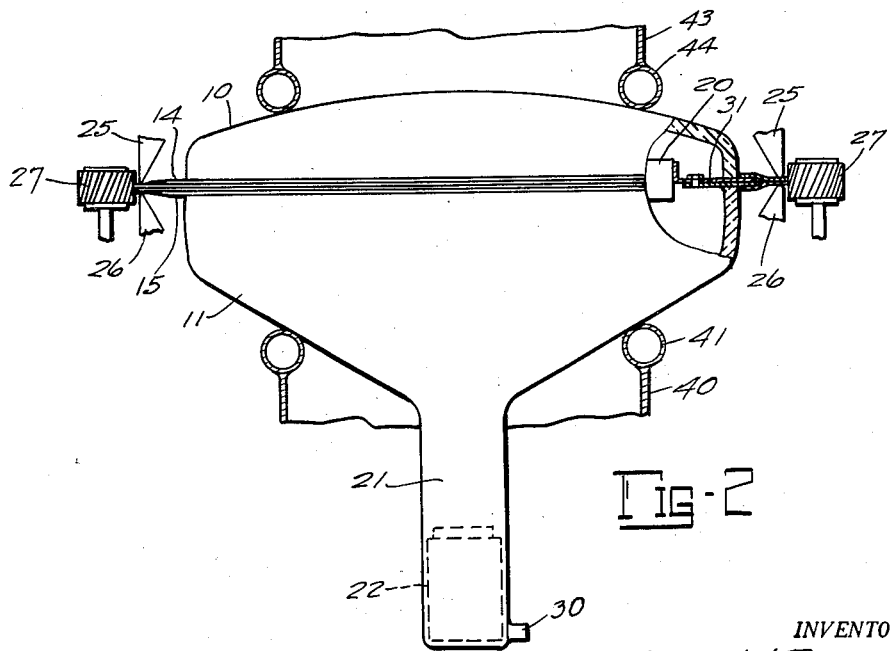
Fig. 2 is a part sectional elevational view illustrating the mounting of the color sandwich on the glass face member, the mounting of the beam gun in the glass funnel member and the trimming of the edges of the sealing bands to contour.

Referring to the drawings (Fig. 1), the glass face plate member 10 and the glass funnel member 11 are shown joined by metal sealing bands 14 and 15, both of which are hermetically sealed to their respective glass members 10 and 11. The color mask or sandwich 20 is mounted upon the band 15 of the funnel 11, and mounted in the neck portion 21 of the funnel 11 is the electron beam gun assembly 22. This gun assembly must be mounted in a certain and definite relationship with respect to the color sandwich 20.

Artificially cooled clamping members 25 and 26 are shown in clamping contact with outer surface areas of the bands 14 and 15, holding the inner surfaces of said bands in intimate line contact with each other along a line extending completely around the tube and having the approximate contour but of different dimension than that of the sealing edges of the tube members 10 and 11. Members 25 and 26 may be internally cooled by circulation of water, air or other fluid or medium therein.

On the horizontally opposite sides of the tube members, as shown, there is provided a combination of a shaping tool or cutter 27 and a heating or welding torch 28 arranged to move together around the periphery of the tube, under control of a contour cam (not shown) to simultaneously and concomitantly trim to a predetermined contour the meeting edges of the bands 14 and 15 while simultaneously fusing together the said trimmed edges into a hermetically sealed tube assembly. The heating or welding torch 28 is preferably of the high temperature type in order that a complete seal between the bands may be quickly accomplished to thus retain the actual seal at the outer edge or perimeter of the bands. Thus only the ends of the bands are directly subjected to the heat.

During this trimming and sealing operation the assembled tube members have been evacuated through opening 30 or any other desired opening, to provide thereby an external pressure upon the tube members 10 and 11 to hold them in sealing position with respect to each other during the trimming and sealing operation.

In the tube structure shown in Fig. 1, it will be noted that the color pack or sandwich 20 and the beam gun assembly 22 are both mounted as attached parts of the funnel member 11 with the electron beam gun assembly 22 fitted into the tube neck 21 and sealed therein. The sandwich 20 is mounted upon inwardly extending pads 31 formed as parts or extensions of the bottom band 15, and is adjustable on said pads 31 in such manner (not shown) as to permit the necessary alignment with the electron beams from the beam gun assembly 22. Such adjustment or alignment is obtained prior to sealing the face plate 10 to the funnel 11.

When the beam guns 22, bottom band 15 and sandwich 20 have been assembled in and upon the funnel member 11, this unit assembly is placed in a holder 40, the upper tube supporting portion of which is of a resilient type such as an air expansible tube member 41.

Thereafter the face plate 10, with its top band 14 hermetically and permanently sealed thereto, is juxtaposed with or upon the funnel 11, with a resilient or spring-like metal member 42 interposed therebetween to act as an equalizer of pressures during the sealing operation.

A second holder member 43 is then positioned on the outer upper surface of face plate 10 under a resilient type pressure supplied by an air expansible tube member 44. Spring or other resilient or fluid action may also be used in place of these tubular members 41 and 44 as pressure means. These pressure assembly holders 40 and 43 may function as the means to apply pressure to the glass tube members 10 and 11 during the band sealing operation, when the tube assembly is not vacuumized, or it may also function in connection with the restoration of the tube assembly to atmospheric pressure, as the means for preventing the creation of undue stress in the glass parts during such restoration.

Referring in particular to Figs. 4 through 7, it will be noted that these sealing bands 14 and 15 have a particular cross-sectional structure which is designed to permit obtaining certain desirable end results, for example, the control of interface stress as between the glass and the band in a completed tube assembly as well as the successive sealing, opening and resealing of the tube. As the bands 14 and 15 are structurally identical, the description of one band will suffice for both.

The glass-to-metal sealing portion 50 of band 14 is fairly heavy in cross-section, possibly of the order of from .060 to .187 of an inch, while the metal-to-metal sealing portion 51 is comparatively thin, for example, of the order from .010 to .040 of an inch. Each portion is made from a metal having certain desirable characteristics, for example, ring or band portion 50 may be made of an alloy compatible for welding with the particular glass composition of the tube members 10 and 11, such as #430 stainless steel or a similar alloy.

Welded or fused to the outer periphery of band 50 is a thin but rather wide rim portion 51 composed of a ductile metal or alloy; copper in pure form or a copper alloy where copper is the major component of the metal composition or a metal or alloy having the necessary ductile characteristics required to obtain the desired end results of the invention here disclosed. The purpose behind the use of such metal and such a thin and wide cross-section in portion 51 is at least six-fold; one, to permit the ironing out of any surface irregularities through the pressure contact of the clamping members 25 and 26 to thereby establish an intimate sealing and welding contact between the portions 51 of the bands 14 and 15; two, to permit the contact of the artifically cooled clamping members 25 and 26 to act as a heat barrier between the point of heat sealing of the band edges and the glass walls of members 10 and 11 whereby heat transmission to the glass members in objectionable amounts is prevented; three, to permit easy trimming of the sealing edges of the bands 14 and 15 as well as a rapid line, edge or perimeter fusing thereof during the sealing operation; four, to obviate or reduce to a minimum any possible interfacial stress in the area of the joining of the glass walls of members 10 and 11 to the metal bands 50 as welded thereto; five, the provision of sufficient width in this portion of the sealing ring to permit successive sealing, opening and resealing when required, the reopening of the sealed edge of the bands being obtained by passing a milling cutter, cutter rolls or a cutting flame along the sealed edge; and six, to reduce the heat capacity of this portion so that but little heat is transmitted to the heavier portions 50.

In Fig. 4 the sealing bands 14 and 15 are shown with a resilient pressure equalizing member 42 interposed, the thin flexible portions 51 of the bands 14 and 15 being spaced apart, and the component members of the tube assembly in their juxtaposed relationship prior to the application of external pressure to the glass members. In Fig. 5 the cooled clamping members 25 and 26 have been applied to the thin portions 51 of the bands 14 and 15, under a pressure sufficient to overcome and iron out any surface irregularities thereof as well as to provide thereby a seal as between the bands of a type capable of permitting the interior of the assembled tube members 10 and 11 to be exhausted to thereby create one form of external pressure thereon. This clamping of the bands 14 and 15 by the cooled clamping members 25 and 26 causes the portions 51 to bend or be drawn toward each other, placing the thicker portions 50 under flexure and causing thereby interface stress in or about the areas 55. In order that such stress may not be permanently retained in the glass walls of the completed tube, the component parts to be sealed together are brought into sealing relationship, in such manner that no stress will exist in the interface area, while the parts are in such relationship. This may be accomplished after clamping of the bands by the exhaustion of the tube assembly to thereby bring the component parts of the tube, i. e., the interfacial areas of the members 10 and 11, rings 14 and 15 and member 42 as indicated in Fig. 6, into a relationship or position where the stress forces in and about these interface areas 55 (Figs. 5 and 7) are obviated completely or at least reduced to a minimum. While these component parts are in such related stress-free position, i. e., vacuumized or under some form of external pressure, cutter 27 and heating members 28 may be moved either at like or different speeds and under contour control around the peripheral edges of the portions 51 of bands 14 and 15, thereby trimming and fusing said edges to form a hermetically sealed perimeter line or edge 52 (Fig. 13). The trimming and fusing operations may be separately accomplished or they may be simultaneously or concomitantly accomplished. Because of the difference in the time element required for the two operations, i. e., trimming and welding, it may be found expedient to move the cutter 27 at a speed greater than that of the heating or welding member 28. Also as a time saving measure the cutter 27 and heating means 28 may be utilized in pairs, thus making it possible to perform the sealing in only one-half revolution around the bands. In most any instance only a single pass or revolution of these members about the band perimeter is necessary to complete the operation.

Because of the combined use of a high temperature sealing means with the consequent relative movement of such heating member 28 progressively along the perimeter of the bands 51, the sealing is quickly accomplished and the heating in any localized area quickly ended before it extends inwardly of the band edges any great distance. Also this same procedure confines the heating and sealing to the end surface areas of the flanges or bands 51 and the depth of the weld may be controlled to a depth approximately equal to the combined thickness of the two flanges or bands 51.

The thickness of the bands 51 will differ in different types of tubes, or under other circumstances, and such thickness will vary with respect to the heavy portions of the sealing bands, as for example, the thickness of the thin band portions may be within the range of from $1/8$ to $1/3$ the thickness of its adjacent thick or heavy portion 50 to which it is attached.

With respect to the trimming of the edges of the bands 51, it will be found that this trimming provides a situation wherein the trimmed edge portions of the webs or bands 51 are made flat and in a plane parallel to the axis of the tube while the meeting faces of these bands 51 are also flat and lying in a single plane perpendicular to the axis of the tube. Such arrangement of the bands provides thereby an ideal condition for sealing them together into a hermetically sealed edge or perimeter sealing.

It is intended that the thin portion 51 of the bands will extend laterally outward from the tube walls and have a radial dimension substantially greater than the radial depth required for the perimeter sealing of the band edges, thus providing a sufficient width or depth to permit successive sealing, opening and resealing.

As indicated in Figs. 7 and 11 the sealing together of the band portions 51 is in effect an edge or line-like seal which does not extend inwardly of the bands to any appreciable extent in order that these edges may be easily and readily unsealed without appreciable loss of metal along said edges. Thus these tubes may be sealed, opened and resealed several times without affecting other desirable characteristics obtained through the disclosed band structure.

Subsequent to the sealing of the bands the external pressure upon the glass members is released, either by restoring the tube to atmospheric pressure or by releasing the pressure applied through the holders 40 and 43. The previously defined component parts of the tube may then tend to move away from each other, as indicated by Fig. 7, thus setting up a stress condition in the glass adjacent the glass-metal interface areas 55. Subsequently, the completed tube assembly is finally exhausted to the commercially high degree of vacuum required and is permanently sealed to retain this high vacuum. The component parts of the tube members are thereby brought back to and retained in their stress-free sealing position, and the finished tube is thus stress-free in the mentioned interface areas.

As previously mentioned herein, tubes may also be produced wherein no resilient or equalizing member 42 is interposed between the bands 14 and 15. In instances where the portions 50 of the bands 14 and 15 are not sufficiently flat and smooth, they may be ground to a matched surface smoothness so that when juxtaposed their meeting surface areas are in matched contact and capable of equalizing any load stress applied thereto (see Figs. 8 and 10).

With the use of such flat bands the same sealing procedure is followed as previously set forth herein, and in so doing the interface stress areas 55 (Figs. 9 and 10) may be created. The spaced-apart relationship of the wide and thin band portions 51, as indicated in Fig. 8 may, when clamped together as in Fig. 9, cause the band portions 50 to tend to move away from each other and thereby create a stress condition in the glass members 10 and 11 in the approximate stress areas 55 thereof.

However, when the tube assembly is vacuumized or placed under some other form of external pressure, which will bring the bands together in flat surface contact (see Fig. 10), the previously imparted stress in the interface areas 55 will be relieved or counter-balanced and provide a stress-free condition in and about such areas 55 of the glass members 10 and 11.

Likewise, when the completed tube is finally evacuated and permanently sealed while so evacuated, there will be thus provided a completed tube with the glass-metal interface in a stress-free condition.

With respect to the sealing of the edges of the bands in either of the types of structures herein described, it is contemplated that any form of perimeter or edge sealing of the bands that is capable of permanently retaining a hermetic seal under the conditions necessary to the final completion of a tube, is within the purview of this invention.

Variations are contemplated within the spirit and scope of the appended claims.

I claim:

1. The method of sealing together the hollow glass members of an electron tube which comprises mounting and hermetically sealing to the open edge portions of each member a metal sealing band comprising a comparatively thick, heavy metal strip extending throughout the periphery of the glass member and a comparatively thin web integral with and projecting outwardly beyond said thicker portion and beyond said glass members, the width of the web being many times greater than its thickness, juxtaposing said members with said strips and webs parallel and said webs held spaced apart by said thicker strip portions, applying a clamping force directly to the outer faces of said webs and thereby bringing the webs together, applying a localized metal fusing heat to the outer edges of the webs at one point in their periphery and advancing the point at which the heat is applied along said edges, the intensity of the heat and the rate of advance being such that the edges are rapidly sealed together and the fusion heat progressively withdrawn before the fused area extends inwardly substantially beyond the said edges.

2. The method defined in claim 1, the clamping pressure applied to said webs being operative to apply a stress to the adjoining rim portions of the glass members, the said method including applying a compressive force to the glass members concurrently with the metal fusing operation by which the said stress is counterbalanced.

3. The method defined in claim 1, which includes holding the sealing bands spaced apart along the peripheries of the glass members during the application of the metal fusing heat by the provision of spring pressure between said members, and after the application of said heat vacuumizing the tube and thereby drawing the sealing bands together along said peripheries.

4. The method defined in claim 1, which includes trimming the edge of the webs to a defined contour concomitantly with the fusing operation by a trimming tool moving along said edge in advance of the fusing means.

5. The method defined in claim 1, which includes applying a coolant to the outer surfaces of the superposed webs at a line extending along the webs adjacent to their outer edges and throughout the length thereof thereby providing a heat-barrier by which transmission of heat to the glass members in an objectionable amount is prevented.

6. The method defined in claim 1, the width of said web portions being many times greater than the width of the fused area whereby the sealed edge portion of the webs may be removed to permit opening of the tube and the tube thereafter repeatedly resealed and reopened in like manner.

References Cited in the file of this patent
UNITED STATES PATENTS

| | | |
|---|---|---|
| 2,167,431 | Bowie | July 25, 1939 |
| 2,490,776 | Braunsdorff | Dec. 13, 1949 |